March 14, 1950     M. J. BOZICH     2,500,271

PNEUMATIC CONVEYER

Filed Feb. 18, 1947

Inventor
MICHAEL J. BOZICH.
Archworth Martin
his Attorney

Patented Mar. 14, 1950

2,500,271

UNITED STATES PATENT OFFICE 2,500,271

PNEUMATIC CONVEYER

Michael Joseph Bozich, Pittsburgh, Pa.

Application February 18, 1947, Serial No. 729,351

4 Claims. (Cl. 302—25)

1

This invention relates to pneumatic conveyors such as the type shown in my application Serial No. 584,067, filed March 22, 1945, and is a modification of the device described and claimed in my application Serial No. 703,411, filed October 15, 1946.

In the apparatus of the said applications, both of which are now abandoned, the material is fed from a hopper or other source into a fluid-pressure line and is conveyed therethrough. In some pneumatic conveyors of this general type, there is a tendency for the powdered or granular material to accumulate or collect somewhat in zones adjacent to the path of the material as it enters the conveyor conduit. Where flour for example is the material being conveyed, such accumulations become stale and moldy and contaminate the pure flour that passes through the apparatus. Again, material of one color may be fed through the device, to be followed by material of another color, with the result that some of the earlier fed material may become entrained with the earlier batch of material.

My present invention has for its object the provision of means for preventing the accumulation of material in a chamber through which the material to be conveyed is fed into a pneumatic conveyor line.

Figure 1:
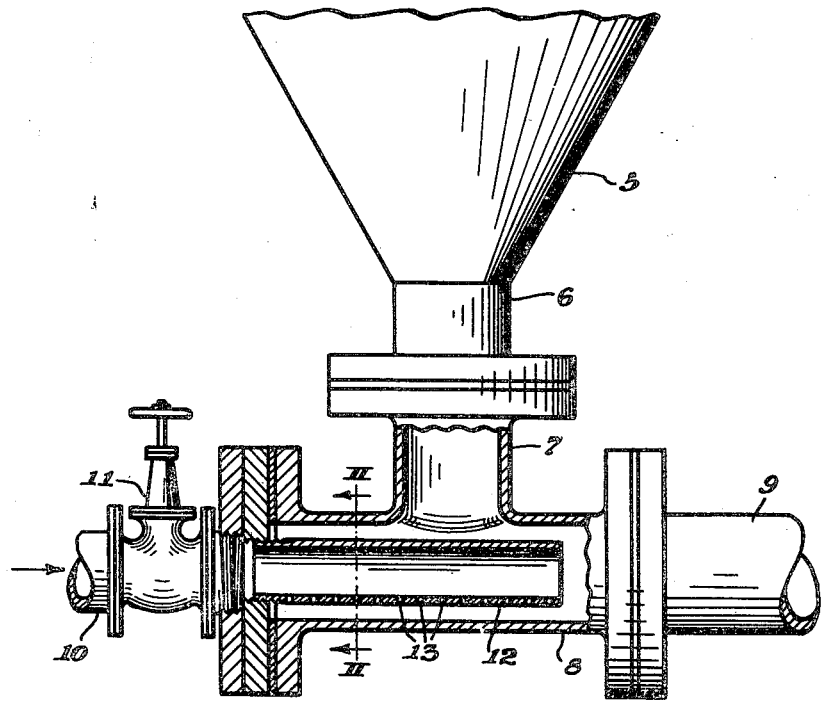
Figure 2:
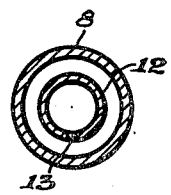
Figure 3:
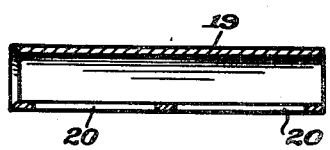
Figure 4:
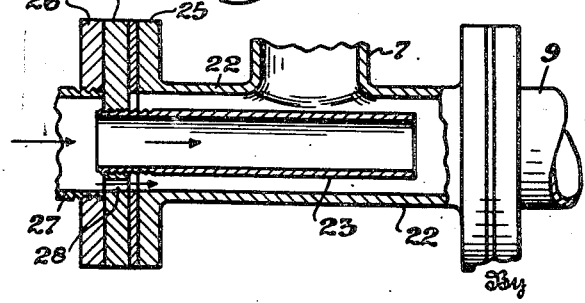

As shown in the accompanying drawing, Figure 1 is a view, partly in side elevation and partly in section, showing a portion of a pneumatic conveyor system that embodies my invention; Fig. 2 is a view taken on the line II—II of Fig. 1; Fig. 3 shows a modification of the jet member of Fig. 1, and Fig. 4 shows a modification of the structure of Fig. 1.

The material to be conveyed is fed from a hopper 5, by gravity or by an applied force through an orifice 6 and a branch 7 of a T-shaped conveyor chamber 8. The material is moved by pneumatic pressure from the chamber 8 through a conduit 9 to its destination. Air under pressure is supplied through a pipe 10, past a valve 11 and through a jet pipe 12. The jet pipe has a row of perforations 13 through its lower wall. The use of a jet pipe is not for the purpose of imparting an initial high velocity to the material to be conveyed, as is common in devices of this general form, but is used rather to provide a throttling action for the material from the hopper 5. Where the pipe 12 is of say 2 inches in diameter and the internal diameter of the chamber 8 approximately three inches, the holes 13 may suitably be of ⅛ inch diameter.

When material is being moved from the hop-

2 per and through the conduit 9, the back pressure on the air in the jet tube 12 will cause some of the air to flow through the perforations 13, and thereby not only prevent any accumulation of material at any zone rearwardly of the branch 7, but will discharge from such rearward zone any material that may have fallen or flowed into the rearward portion of the chamber 8. All materials fed from the hopper 5 are thus cleanly and completely discharged from the chamber 8 into the conduit 9.

While I have referred to my invention as particularly suitable for use with the low-pressure conveying systems referred to in my said two applications, it will be understood that it will be of utility also in high-pressure conveying systems.

Instead of employing a series of holes 13 in the jet tube, I may use a jet tube having either a single long slot or a plurality of slots. For example, in Fig. 3, I show a tube 19 that may be substituted for the jet tube 12, the tube 19 having a pair of slots 20 through which some of the air will be discharged to prevent accumulation of material below the jet tube and rearwardly of the inlet 7.

Referring now to Fig. 4, the conveyor chamber 22 is of the same form as the chamber 8 of Fig. 1, but I provide another means for introducing auxiliary air at the rear end of the chamber, for discharging material therefrom or preventing the accumulation of the conveyed material rearwardly of the inlet 7. In this arrangement, the jet tube 23 has no lateral openings. The rear end of the tube has threaded connection with a pipe flange or collar 24 that is disposed between a flange 25 on the chamber 22 and a pipe flange 26 into which a fluid-pressure supply line 27 is threaded. An opening, or openings 28 is provided through the collar 24, so that a small part of the air from the line 27 will pass into the rear end of the chamber.

This jet pipe 23, as well as the jet pipe 12 are threaded for adjustment in axial directions, so as to change the position of the forward end of the jet with respect to the inlet 7 and thereby vary the rate at which the material is fed to the conduit 9.

I claim as my invention:

1. A pneumatic conveying device comprising a conveyor chamber having an air-pressure inlet opening at its rear end and a discharge opening at its forward end, and having a laterally-extending inlet passageway intermediate its ends, for charging the material to be conveyed, and an air jet tube extending forwardly through said rear opening and past the intermediate inlet, the tube being of small diameter relative to the chamber and having near its rear end lateral discharge openings through its lower side and behind the charging zone, of a total area that is less than the diametral area of the tube at its forward end.

2. A pneumatic conveying device comprising a conveyor chamber of generally cylindrical form and having an air-pressure inlet opening and a discharge opening, at its rear and front ends respectively, and also having intermediate its ends a laterally-disposed inlet opening for charging the material to be conveyed, a jet tube of relatively small diameter extending forwardly from the air inlet opening, past the said lateral opening, and means for directing into the rear end of the chamber, at a point below the jet tube, and behind the charging zone a portion of the air under pressure, which portion is less than that which is discharged from the forward end of the tube.

3. A pneumatic conveying device comprising a conveyor chamber of generally cylindrical form and having an air-pressure inlet opening and a discharge opening, at its rear and front ends respectively, and also having intermediate its ends a laterally-disposed inlet opening for charging the material to be conveyed, and a jet tube of relatively small diameter extending forwardly from the air inlet opening, to a point forwardly of the said lateral opening, and means for directing into the rear end of the chamber and behind the charging zone a portion of the air under pressure, which portion is less than that which is discharged from the forward end of the tube, the said means comprising an opening through the lower part of the tube wall, at the rear end of the chamber.

4. A pneumatic conveying device comprising a conveyor chamber of generally cylindrical form and having an air-pressure inlet opening and a discharge opening, at its rear and front ends, respectively, means for introducing material to be conveyed, at a zone intermediate the ends of the chamber, means for supplying air under forwardly directed pressure at the front end of said zone, and means for directing a smaller quantity of air under pressure, into the rear end of the chamber, at a point adjacent to its lower wall and behind the said zone.

MICHAEL JOSEPH BOZICH.

REFERENCES CITED

The following references are of record in the file of this patent:

UNITED STATES PATENTS

| Number | Name | Date |
|---|---|---|
| 738,172 | Edwards | Sept. 8, 1903 |
| 1,019,592 | Booth | Mar. 5, 1912 |
| 1,252,211 | White | Jan. 1, 1918 |
| 1,718,507 | Wenzel et al. | June 25, 1929 |
| 2,107,084 | Pletcher | Feb. 1, 1938 |
| 2,420,388 | Thomas | May 13, 1947 |